(12) United States Patent
Pien

(10) Patent No.: US 8,493,464 B2
(45) Date of Patent: Jul. 23, 2013

(54) RESOLUTION ADJUSTING METHOD

(75) Inventor: Hsiu-Hung Pien, Hsinchu (TW)

(73) Assignee: Altek Corporation, Hsinchu (TW)

( * ) Notice: Subject to any disclaimer, the term of this patent is extended or adjusted under 35 U.S.C. 154(b) by 337 days.

(21) Appl. No.: 12/818,908

(22) Filed: Jun. 18, 2010

(65) Prior Publication Data

US 2011/0310273 A1 Dec. 22, 2011

(51) Int. Cl.
*H04N 5/228* (2006.01)
*H04N 5/76* (2006.01)
*G06K 9/00* (2006.01)

(52) U.S. Cl.
USPC ............... 348/222.1; 348/231.2; 382/103

(58) Field of Classification Search
USPC ............. 348/208.4, 208.6, 208.13, 208.16, 348/231.1, 231.2, 222, 1, 229.1; 382/103, 382/104
See application file for complete search history.

(56) References Cited

U.S. PATENT DOCUMENTS

| | | | |
|---|---|---|---|
| 7,787,024 B2 * | 8/2010 | Yoshida | 348/231.1 |
| 2006/0203903 A1 * | 9/2006 | Shih et al. | 375/240.01 |
| 2008/0180520 A1 * | 7/2008 | Chang et al. | 348/36 |
| 2008/0192129 A1 * | 8/2008 | Walker et al. | 348/231.2 |

* cited by examiner

*Primary Examiner* — Kelly L Jerabek
(74) *Attorney, Agent, or Firm* — Morris Manning & Martin LLP; Tim Tingkang Xia, Esq.

(57) ABSTRACT

A method for adjusting resolution is applicable to an image capturing device, such that the image capturing device can analyze an amount of objects in the image captured thereby and determine a resolution for storing the image according to the amount of objects in the image, thereby making use of storage resources effectively. It is determined whether to zoom in/out the captured image or to lower the resolution of the image capturing device by analyzing the amount of the objects in the captured image and comparing the analyzed amount of the objects with one or more threshold values.

5 Claims, 10 Drawing Sheets

RESOLUTION ADJUSTING METHOD

BACKGROUND OF THE INVENTION

1. Field of Invention

The present invention relates to an image processing method, and more particularly to a resolution adjusting method.

2. Related Art

With the rapid development of digital cameras, photography is no longer an expensive entertainment. A user is enabled to take any desirable picture at will, so as to record a memorizable moment or image.

When taking pictures, the user normally expects that the obtained pictures are clear. Thus, when taking pictures of a target (including scenery, human, or article), the user needs to adjust a focal length and a brightness for the target properly, so as to obtain satisfactory pictures.

With the progress of technologies, most digital cameras are provided with the function of automatic setting of shooting parameters. Generally, the digital camera calculates proper shooting parameters for a specific target.

Considering the resolution of the captured image, the user is required to adjust the resolution independently through a relevant menu provided on the digital camera before capturing an image.

If the user does not alter the resolution setting, the images captured for various occasions, topics, and main characters all have the same resolution.

Since the digital camera has a limited storage space, when the resolution is set at a higher level, the number of images that can be captured is reduced. In addition, after the images are sorted later, the user usually finds that many pictures that are hardly worth using but not bad enough to throw away are kept to occupy storage resources, for example, a memory card in the digital camera, a hard disc on a computer, a burnt optical disc, or a personal photo album on the network.

On the contrary, if a lower resolution is selected to save the storage space, details of certain wonderful images are sacrificed.

If the highest resolution is selected to record as many details as possible, pictures with subordinate, poor, or extremely poor quality may less valuably or least valuably occupy the space of the storage medium of the camera, which greatly influences the number of pictures that can be taken.

SUMMARY OF THE INVENTION

In view of the above problems, the present invention is a resolution adjusting method, which solves one or more problems in the prior art.

The present invention provides a resolution adjusting method, which is applicable to an image capturing device. The image capturing device includes a camera module and a storage unit.

First, the camera module captures an image with a first resolution, and analyzes an amount of objects in the captured image.

Then, the analyzed amount of the objects is compared with one or more threshold values.

When the analyzed amount of the objects is smaller than one or more of the one or more threshold values, according to the threshold value(s) which the analyzed amount of the objects is smaller than, the resolution of the image or a resolution of the image capturing device is lowered from the first resolution to a second resolution, and then an image with the second resolution is re-captured. Then, the image with the second resolution is stored in the storage unit.

When the analyzed amount of the objects is greater than or equal to all the threshold values, the image with the first resolution is stored in the storage unit.

As for the amount of the objects in the image, an edging procedure is performed first to edge the captured image, and an amount of graph blocks or content of edging elements in the edged image is calculated, so that the calculated amount of the graph blocks or content of the edging elements is taken as the amount of the objects.

The resolution adjusting method according to the present invention is applicable to an image capturing device, which determines a resolution for storing a captured image by analyzing an amount of objects in the captured image, that is, determines whether to zoom in/out the captured image or whether to lower a resolution of the image capturing device, thereby making use of storage resources effectively.

BRIEF DESCRIPTION OF THE DRAWINGS

The present invention will become more fully understood from the detailed description given herein below for illustration only, and thus are not limitative of the present invention, and wherein:

FIG. 6A and FIG. 6C show a flow chart of a resolution adjusting method according to a sixth embodiment of the present invention.

DETAILED DESCRIPTION OF THE INVENTION

The resolution adjusting method according to the present invention is applicable to an image capturing device, which determines a resolution for storing a captured image by analyzing an amount of objects in the captured image, that is, determines whether to zoom in/out the captured image or whether to lower a resolution of the image capturing device, thereby making use of storage resources effectively. The image capturing device may be a digital camera, a digital video camera, or an electronic device with a camera module (for example, a mobile phone or a computer).

Figure 1:
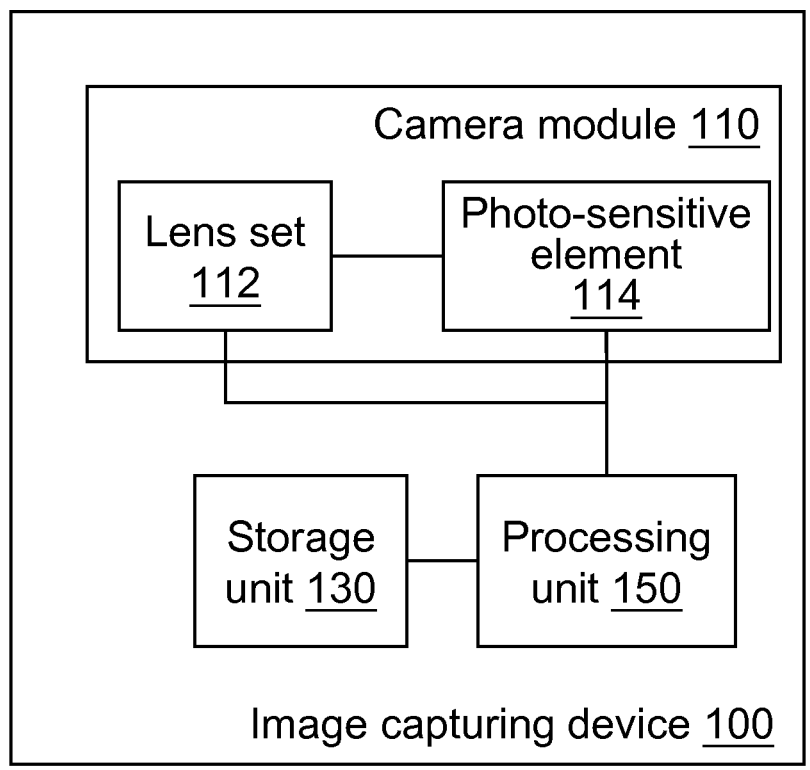
FIG. 1 is a schematic view of an image capturing device.

Referring to FIG. 1, an image capturing device 100 includes a camera module 110, a storage unit 130, and a processing unit 150. The camera module 110 includes a lens set 112 and a photo-sensitive element 114.

The lens set 112 is used for adjusting a focal length to a shot object.

The photo-sensitive element 114 is set corresponding to the lens set 112. The photo-sensitive element 114 receives an optical signal corresponding to a target and scenery around through the lens set 112, and converts the received optical signal into an electrical signal of a digital image, so as to obtain an image corresponding to the target. In other words, the photo-sensitive element 114 captures an image of a view-finding picture via the lens set 112.

The processing unit 150 is electrically connected to the photo-sensitive element 114 and the storage unit 130. The processing unit 150 controls operations of the lens set 112 and the photo-sensitive element 114 and stores the captured image in the storage unit 130.

The processing unit 150 further analyzes an amount of objects in the captured image, and selectively adjusts a resolution setting of the captured image or a resolution of the image capturing device according to the amount of the objects in the captured image.

In other words, the resolution adjusting method according to the present invention may be realized in the image capturing device 100 in a form of a software or firmware program. That is, the program code for implementing the resolution adjusting method of the present invention may be stored in the image capturing device 100, and then the processing unit 150 of the image capturing device 100 reads and executes the stored program code, so that the image capturing device 100 performs the resolution adjusting method of the present invention.

The processing unit 150 may be implemented by one or more processors, for example, digital signal processors (DSPs). The storage unit 130 may be implemented by one or more storages. The storages may be non-volatile memories or volatile memories.

The image to be analyzed may be a live view image or a shooting image. The live view image refers to an image captured by the image capturing device 100 in the live view stage or the auto focusing stage. The shooting image refers to an image captured by the image capturing device 100 in the shooting stage.

Generally, the operation of the image capturing device 100 is divided into a live view stage, an auto focusing stage, and a shooting stage.

The live view stage refers to the time before the user presses a shutter button of the image capturing device 100. In the live view stage, the user may live view the view-finding picture via a display (not shown) of the image capturing device 100.

The auto focusing stage refers to the time when the user half-presses the shutter button of the image capturing device 100. In the auto focusing stage, the image capturing device 100 may take one or more subjects in the view-finding picture as the target, and adjust an object distance between the lens set 112 and the target, and the user may live view the view-finding picture after the live view and focusing process (that is, after the object distance is adjusted) via the display (not shown) of the image capturing device 100.

The shooting stage refers to the time when the user full-presses the shutter button of the image capturing device 100. In the shooting stage, the image capturing device 100 captures the current view-finding picture through the camera module 110 and records the captured view-finding picture as an image.

Figure 2A:
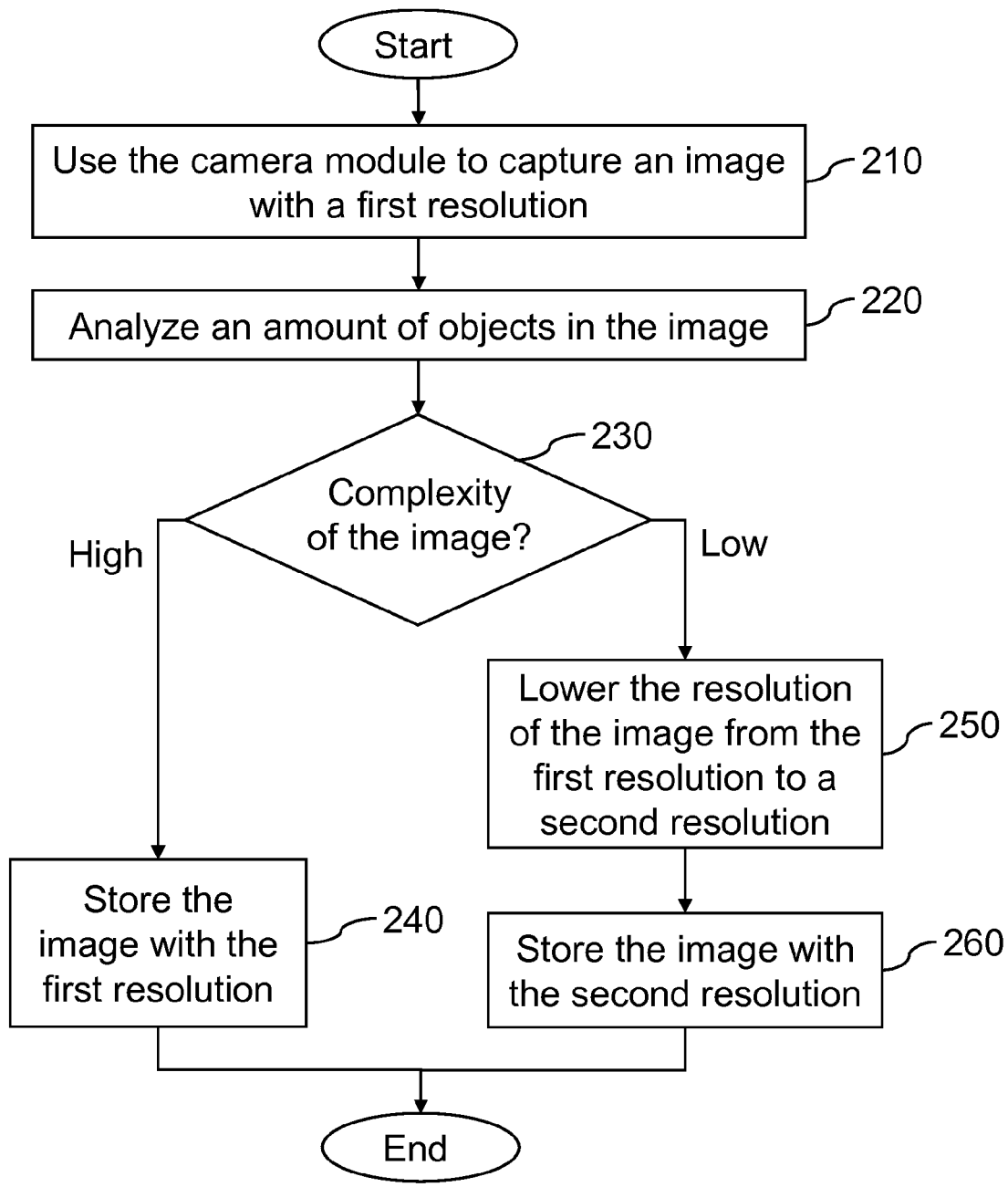
FIG. 2A is a flow chart of a resolution adjusting method according to a first embodiment of the present invention.
Figure 2B:
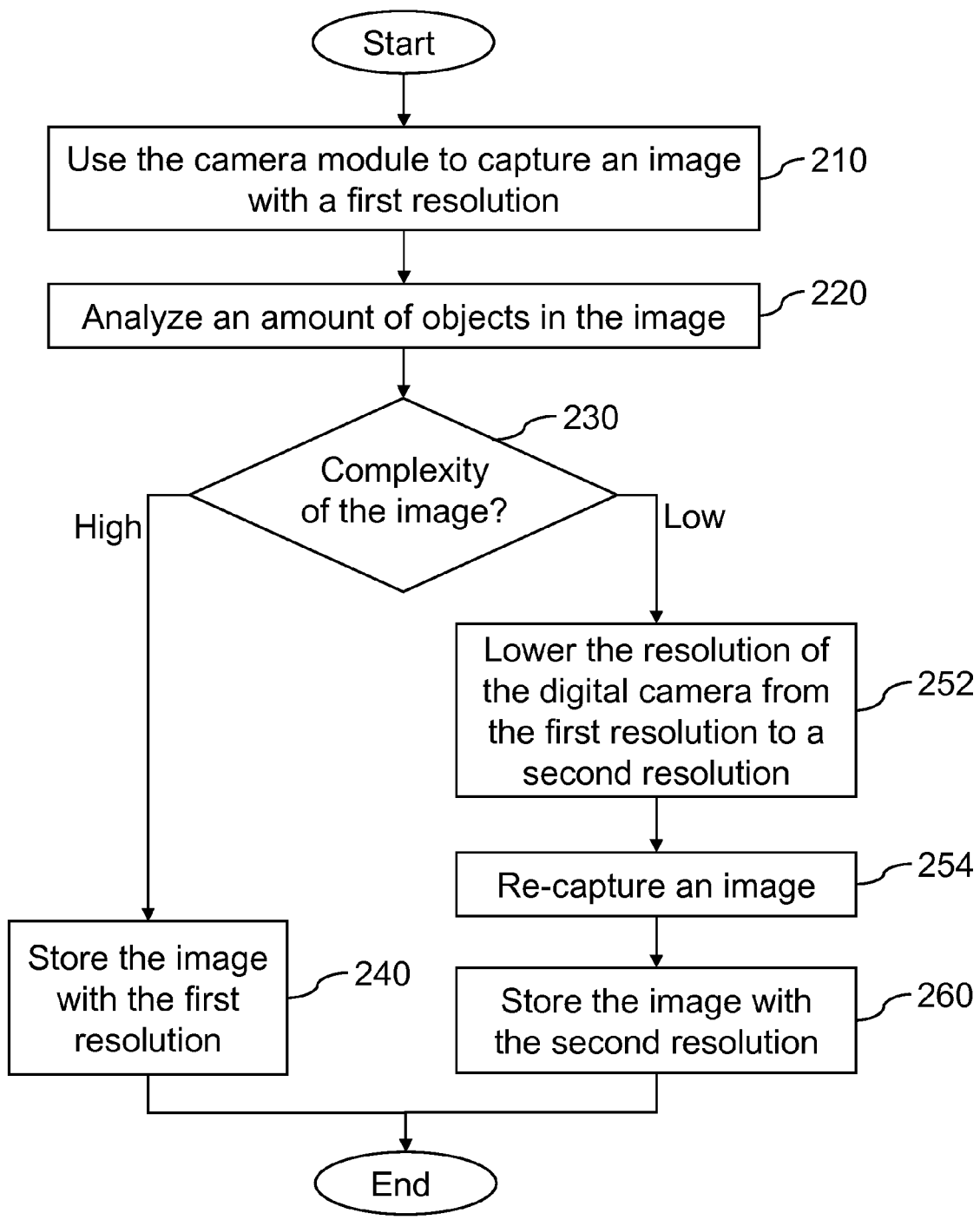
FIG. 2B is a flow chart of a resolution adjusting method according to a second embodiment of the present invention.

FIGS. 2A and 2B are flow charts of a resolution adjusting method according to two embodiments of the present invention, respectively.

Referring to FIGS. 1, 2A, and 2B, first, the camera module 110 captures an image corresponding to a plurality of subjects in front of the image capturing device 100 (Step 210). The image has a first resolution. The first resolution may be a currently set resolution of the image capturing device 100 or an upper limit of the resolution of the image capturing device 100 (the upper limit may be determined by the capability of the image capturing device 100). The subjects may be human faces, buildings, animals, plants, mountains, clouds, stones, flowing water, vehicles, signs, or at least one feature object of a specific article.

Next, an amount of objects in the captured image is analyzed (Step 220).

A complexity of the image is determined by using the analyzed amount of the objects, that is, it is determined whether the amount of the objects satisfies a setting condition (Step 230). Thus, the complexity of the image refers to an amount of details (that is, subjects) shown in the image.

When the complexity of the image is higher, the image with the first resolution is stored in the storage unit 130 (Step 240).

When the complexity of the image is lower, the resolution of the captured image is lowered from the first resolution to the second resolution (Step 250); or the resolution setting of the image capturing device is lowered from the first resolution to the second resolution (Step 252). Then, after the adjustment, the camera module 110 is used to re-capture an image (Step 254). At this time, the image has the second resolution.

Then, the image with the second resolution is stored in the storage unit 130 (Step 260).

Figure 3A:
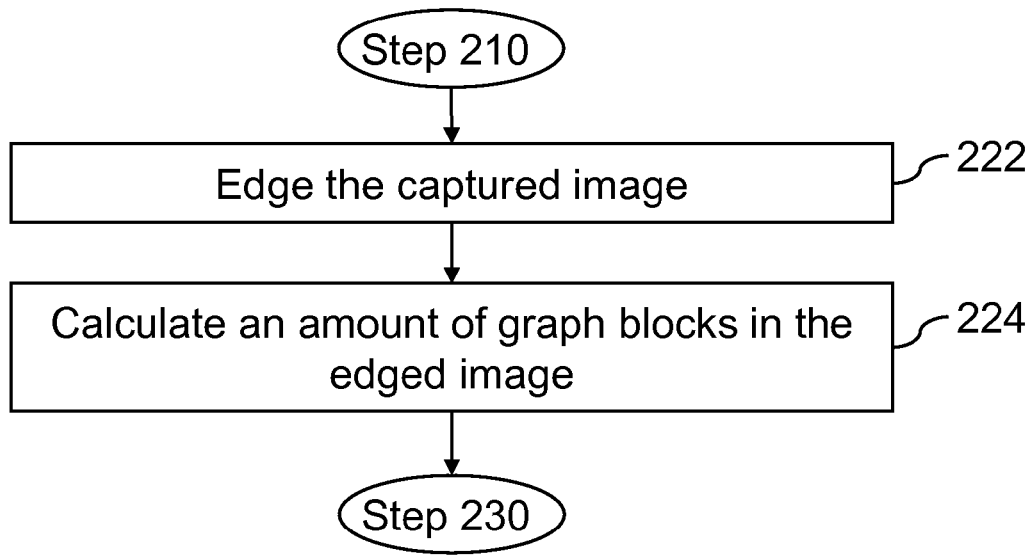
FIG. 3A is a detailed flow chart of Step 220 according to an embodiment of the present invention.
Figure 3B:
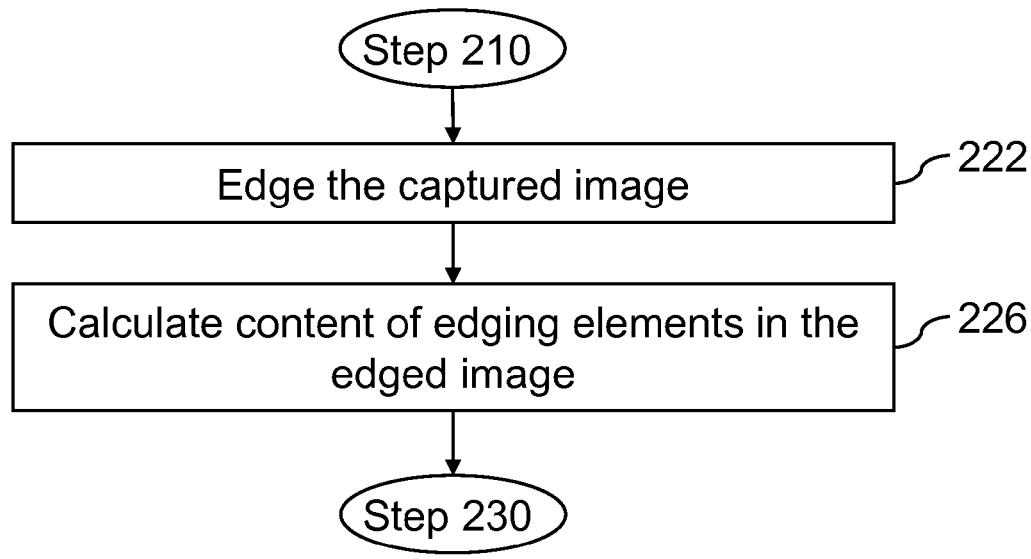
FIG. 3B is a detailed flow chart of Step 220 according to another embodiment of the present invention.

Referring to FIGS. 3A and 3B, in Step 220, the processing unit 150 performs an edging procedure to edge the captured image (Step 222), and then calculates an amount of graph blocks or content of edging elements in the edged image (Step 224 or Step 226), and takes the calculated amount of the graph blocks or content of the edging elements as the amount of the objects.

Figure 4:
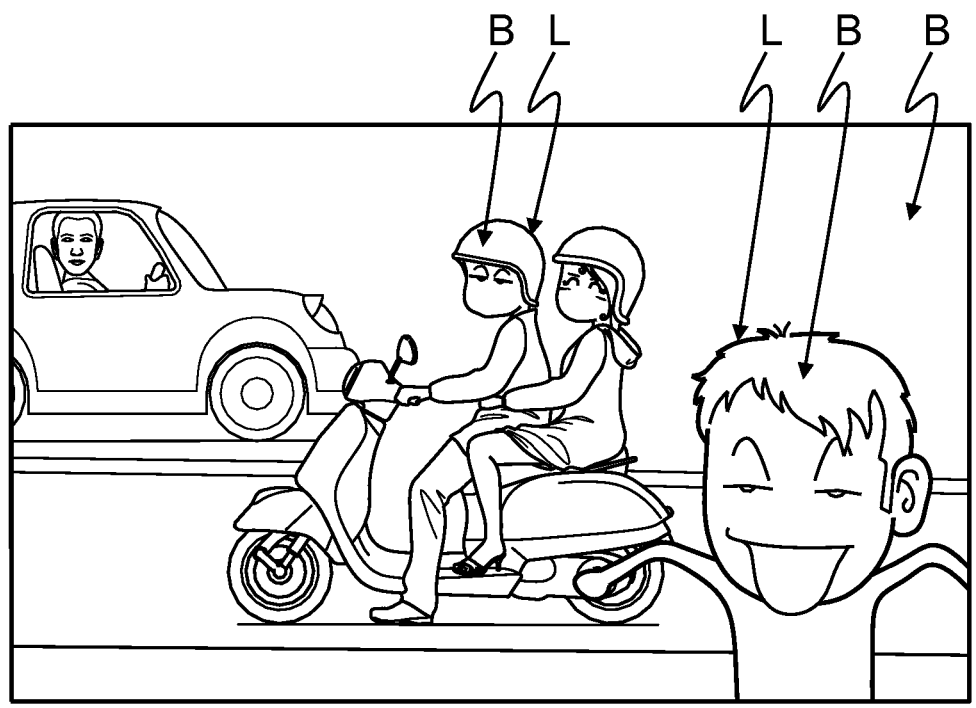
FIG. 4 is a schematic view of an image edging process according to an embodiment of the present invention.

Referring to FIG. 4, graph blocks B refer to graph blocks defined by edging elements L. The content of the edging elements may be a number of pixels belonging to the edging elements or a proportion taken by the edging elements in the whole image.

In addition, in Step 220, the processing unit 150 may perform a recognition procedure to recognize and calculate an amount of subjects in the captured image, and take the calculated amount of the subjects as the amount of the objects.

In Step 230, a threshold value or relation information including a plurality of threshold values and corresponding resolution adjusting data (for example, a mapping table between threshold values and resolution adjusting data) is compared with the analyzed amount of the objects, thereby determining the complexity of the image.

Figure 5A:
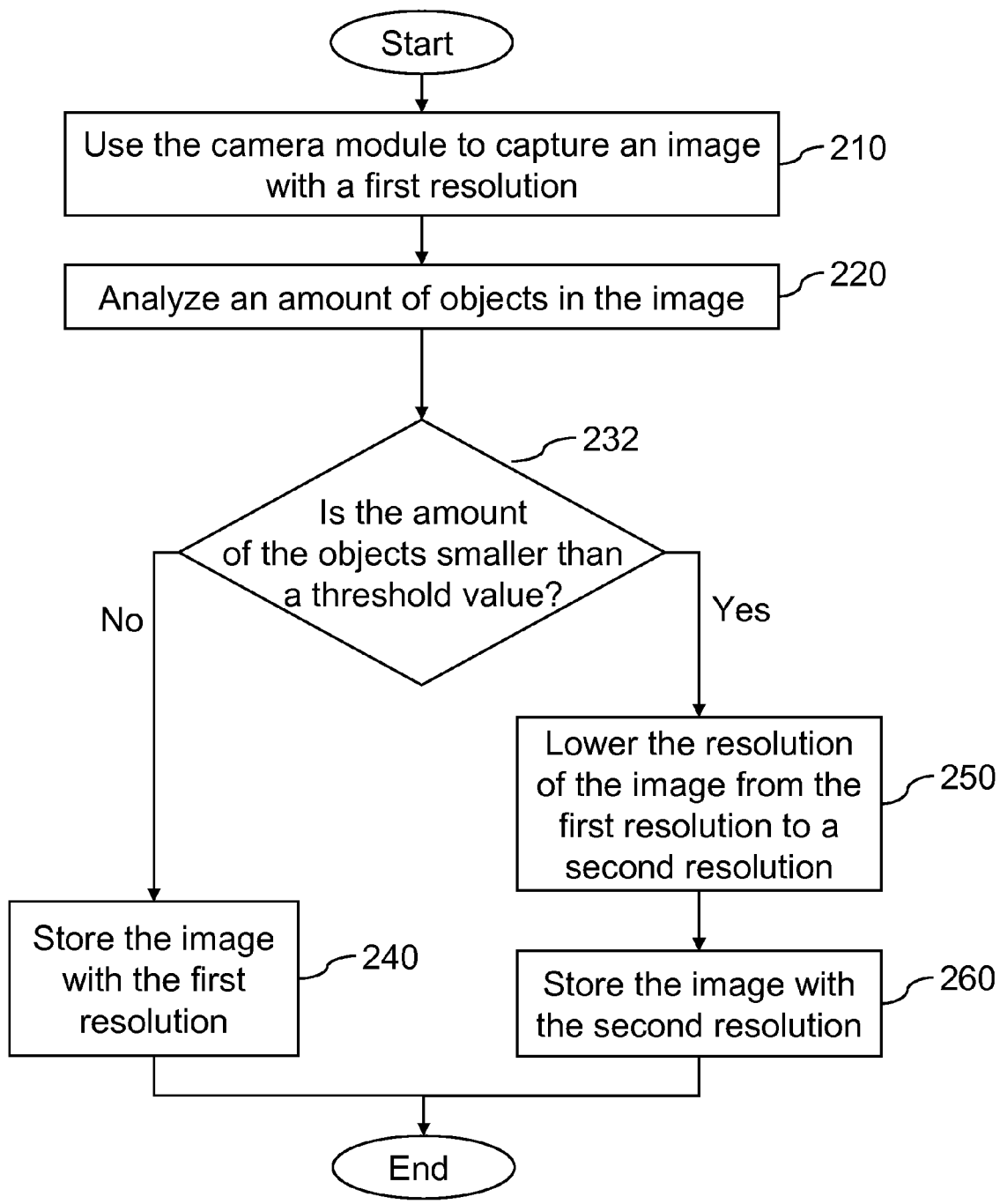
FIG. 5A is a flow chart of a resolution adjusting method according to a third embodiment of the present invention.
Figure 5B:
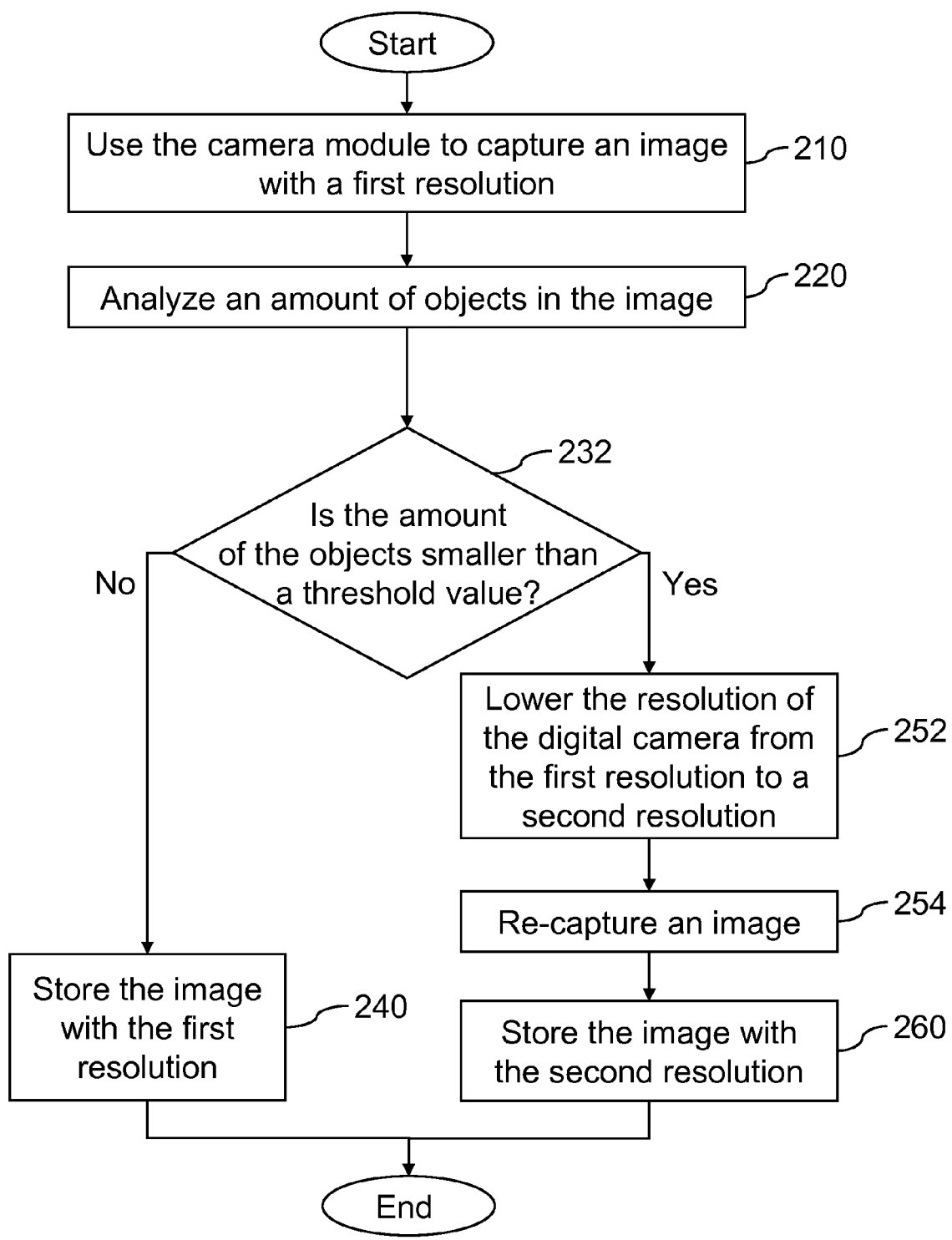
FIG. 5B is a flow chart of a resolution adjusting method according to a fourth embodiment of the present invention.

As for a single threshold value, referring to FIGS. 5A and 5B, the obtained amount of objects is compared with the threshold value (Step 232).

When the amount of the objects is greater than or equal to the threshold value, it indicates that the complexity of the image is high, so that no resolution (the resolution of the image or the resolution setting of the image capturing device 100) adjustment is performed (Step 240).

When the amount of the objects is smaller than the threshold value, it indicates that the complexity of the image is low, so that the resolution of the image is lowered from the first resolution to the second resolution (Step 250). Alternatively, the resolution setting of the image capturing device is lowered from the first resolution to the second resolution (Step 252), and an image with the second resolution is re-captured (Step 254).

In Steps 250 and 252, when it is determined that the complexity of the image is low, the current resolution (the resolution of the image or the resolution setting of the image capturing device 100) may be lowered based on a specific factor. In other words, the first resolution may be a specific multiple of the second resolution, for example, may be one time, twice, or more than triple as much as the second resolution.

For example, it is assumed that a current resolution (that is, the first resolution) of the image capturing device 100 is set to 6 MP, and the specific factor is preset to one time. In this case, the image captured by the image capturing device 100 through the camera module 110 has a resolution of 6 MP.

When the analyzing and determining result is that the complexity of the image is low, the processing unit 150 performs a resolution adjusting procedure to lower the resolution of the image from 6 MP (that is, the first resolution) to 3 MP (that is, the second resolution). Alternatively, the processing unit 150 performs a resolution adjusting procedure to lower the current resolution setting (that is, the first resolution) of the image capturing device 100 from 6 MP to 3 MP (that is, the second resolution).

In Steps 250 and 252, alternatively, according to a setting option of the resolution of the image capturing device 100, the resolution of the image or the resolution setting of the image capturing device 100 is lowered from the first resolution to the second resolution for a difference of a specific level. In other words, the first resolution is different from the second resolution for a specific level, for example, one level, two levels, or more than three levels.

For example, it is assumed that the setting option of the resolution provided by the image capturing device 100 is 10 MP, 8 MP, 6 MP, 4 MP, 3 MP, 2 MP, and 1 MP, the current resolution (that is, the first resolution) is set to 8 MP, and the specific level is preset to one level.

At this time, when it is determined that the complexity of the image is low, the processing unit 150 performs a resolution adjusting procedure, and lowers the resolution of the image from 8 MP (that is, the first resolution) to 6 MP (that is, the second resolution), or lowers the current resolution setting (that is, the first resolution) of the image capturing device 100 from 8 MP to 6 MP (that is, the second resolution).

Here, the image capturing device 100 may additionally set that the adjusted resolution (that is, the second resolution) should be no less than a lower limit of the resolution of the image capturing device 100 (the lower limit is determined by the capability of the image capturing device 100).

Moreover, the user may independently set a minimum value (that is, the second resolution) of the resolution that can be adjusted according to the provided setting option of the resolution.

When the preset value of the adjusted second resolution is smaller than the lower limit of the resolution of the image capturing device 100 or the set minimum value of the resolution that can be adjusted, the lower limit of the resolution of the image capturing device 100 or the set minimum value of the resolution that can be adjusted is directly taken as the value of the second resolution. In other words, if the preset value of the adjusted second resolution is smaller than the lower limit of the resolution of the image capturing device 100 or the set minimum value of the resolution that can be adjusted, when the resolution is adjusted, the resolution is lowered from the first resolution to the lower limit of the resolution of the image capturing device 100 or the set minimum value of the resolution that can be adjusted.

Figure 6A:
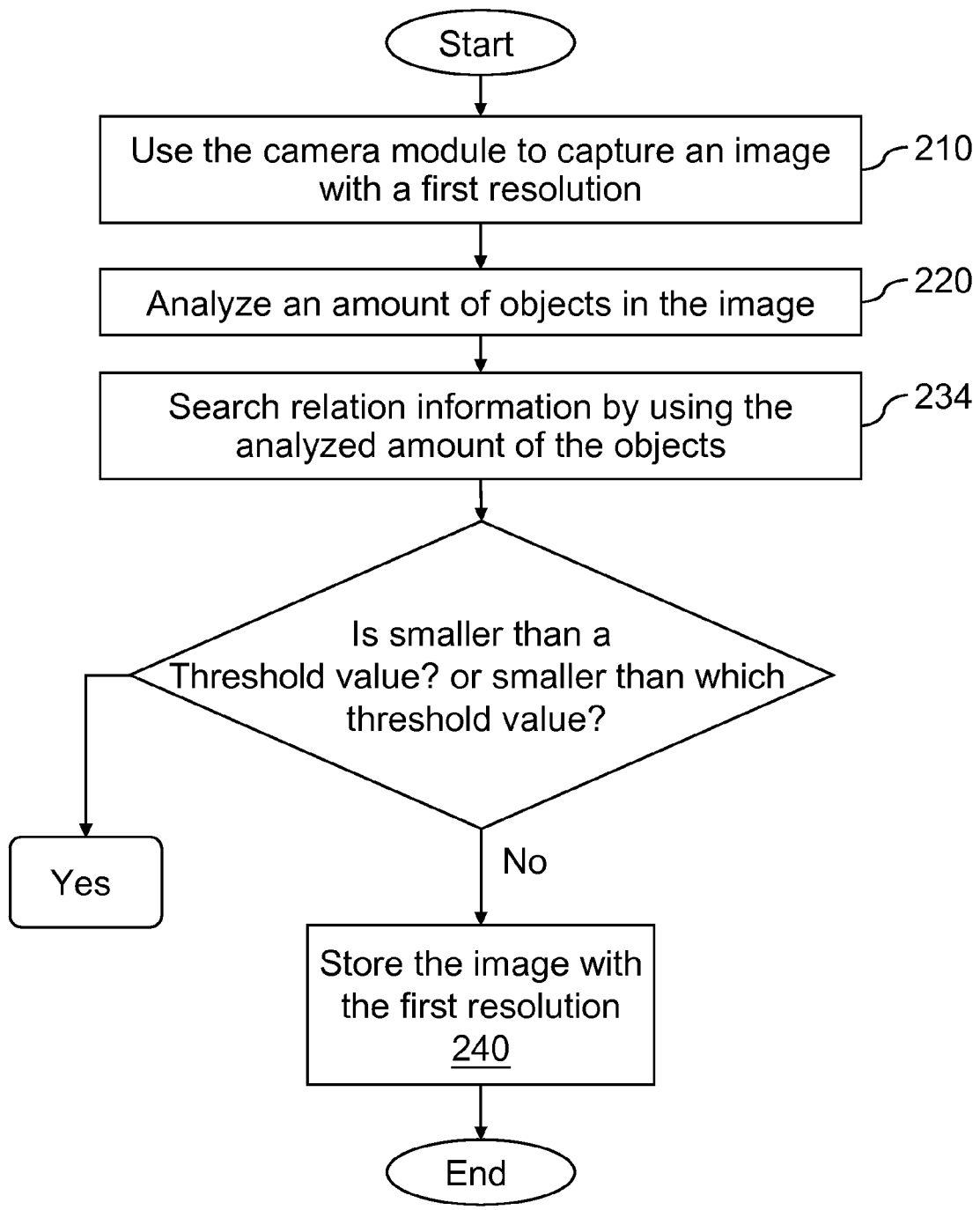
FIG. 6A and FIG. 6B show a flow chart of a resolution adjusting method according to a fifth embodiment of the present invention.
Figure 6B:
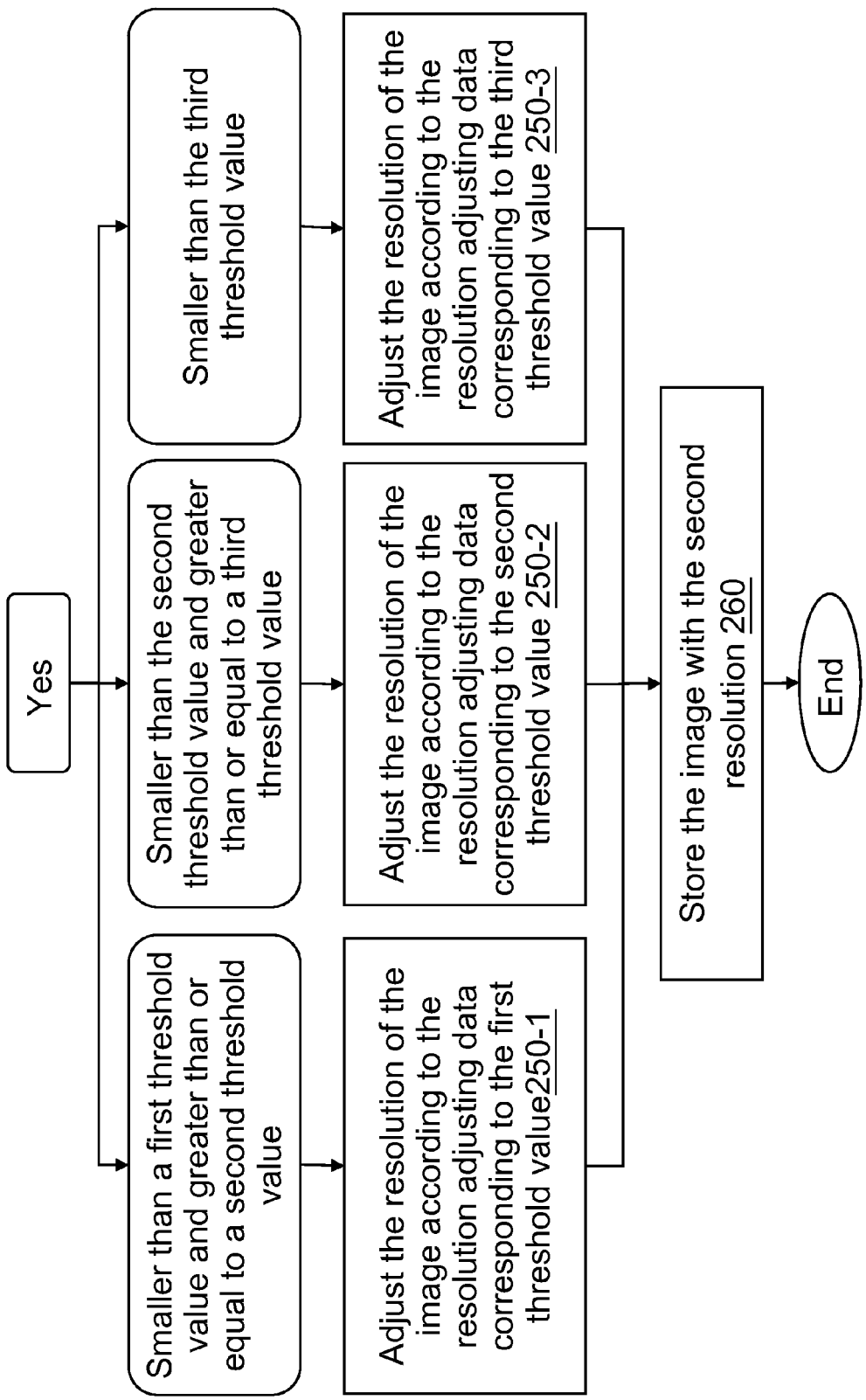
Figure 6C:
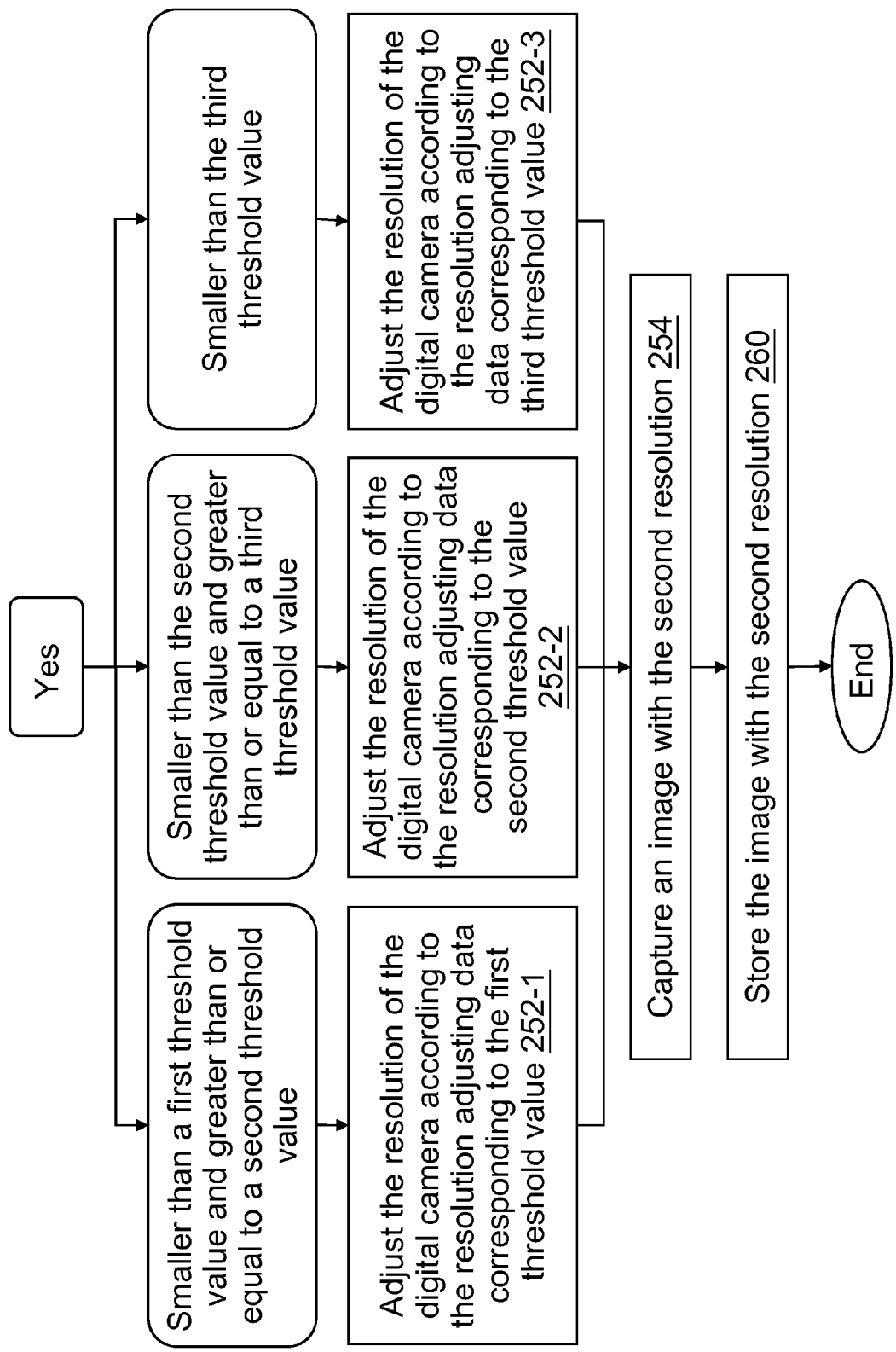

In addition, referring to FIGS. 6A, 6B and 6C, relation information is searched by using the analyzed amount of the objects (Step 234). The relation information includes a plurality of threshold values different from one another and resolution adjusting data corresponding to each threshold value.

Each resolution adjusting data represents a different adjusting result (that is, a different value of the adjusted second resolution). Thus, the threshold value may be a value or a status mark. The adjusting result may be a specific value, a specific factor, or a specific level (depending upon the setting option of the resolution of the image capturing device 100).

For ease of description, three threshold values are taken as an example, and the three threshold values are sequentially referred to as a first threshold value, a second threshold value, and a third threshold value from large to small.

When the analyzed amount of the objects is greater than or equal to the first threshold value, the resolution is not adjusted, and the image with the first resolution is stored in the storage unit 130 (Step 240). Since the first threshold value is greater than the second threshold value and the third threshold value, the analyzed amount of the objects is also greater than the second threshold value and the third threshold value.

When the analyzed amount of the objects is smaller than the first threshold value and greater than or equal to the second threshold value, the resolution is lowered from the first resolution to the second resolution according to the resolution adjusting data corresponding to the first threshold value (Step 250-1 and Step 252-1). At this time, the second resolution matches the resolution adjusting data corresponding to the first threshold value.

When the analyzed amount of the objects is smaller than the second threshold value but greater than or equal to the third threshold value, the resolution is lowered from the first resolution to the second resolution according to the resolution adjusting data corresponding to the second threshold value (Step 250-2 and Step 252-2). At this time, the second resolution matches the resolution adjusting data corresponding to the second threshold value.

When the analyzed amount of the objects is smaller than the third threshold value, the resolution is lowered from the first resolution to the second resolution according to the resolution adjusting data corresponding to the third threshold value (Step 250-3 and Step 252-3). At this time, the second resolution matches the resolution adjusting data corresponding to the third threshold value.

In other words, when the analyzed amount of the objects is smaller than at least one threshold value, the processing unit 150 adjusts the resolution according to the resolution adjusting data corresponding to the minimum threshold value among the threshold values that are greater than the analyzed amount of the objects (Step 250 and Step 252).

Here, when the preset value of the adjusted second resolution is smaller than the lower limit of the resolution of the image capturing device 100 or the set minimum value of the resolution that can be adjusted, the lower limit of the resolution of the image capturing device 100 or the set minimum value of the resolution that can be adjusted is directly taken as the value of the second resolution. In other words, when the preset value of the adjusted second resolution is smaller than the lower limit of the resolution of the image capturing device 100 or the set minimum value of the resolution that can be adjusted, the resolution of the image to be adjusted is lowered from the first resolution to the lower limit of the resolution of the image capturing device 100 or the set minimum value of the resolution that can be adjusted.

Here, two threshold values are taken as an example for ease of description, and the relations between the threshold values and corresponding resolution adjusting data are listed in the following Table 1. However, the numbers are not intended to limit the present invention.

TABLE 1

| Threshold value | Resolution adjusting data |
|---|---|
| First threshold value | First adjusting result |
| Second threshold value | Second adjusting result |

In other words, the relation information may be a mapping table between the threshold values and the resolution adjusting data.

For example, the first threshold value may be set to 50%, and the second threshold value may be set to 30%. Accordingly, the larger the number is, the higher the complexity will be. However, the present invention is not thus limited. The first adjusting result may be set as being lowered for one level, and the second adjusting result may be set as being lowered for two levels.

It is assumed that the setting option of the resolution provided by the image capturing device 100 is 10 MP, 8 MP, 6 MP, 4 MP, 3 MP, 2 MP, and 1 MP, and the current resolution (that is, the first resolution) is set to 8 MP.

When the analyzed amount of the objects is greater than or equal to the first threshold value, the resolution of the image is not adjusted, and the captured image with the resolution of 8 MP is stored in the storage unit 130.

When the analyzed amount of the objects is smaller than the first threshold value and greater than or equal to the second threshold value, the processing unit 150 performs a resolution adjusting procedure, lowers the resolution of the image from 8 MP (that is, the first resolution) to 6 MP (that is, the second resolution) according to the resolution adjusting data corresponding to the first threshold value (that is, the first adjusting result), and stores the image with the resolution of 6 MP in the storage unit 130. Alternatively, the current resolution setting of the image capturing device 100 is adjusted from 8 MP to 6 MP according to the resolution adjusting data corresponding to the first threshold value (that is, the first adjusting result), and then re-captures an image with a resolution of 6 MP. And, the image capturing device 100 stores the re-captured image with the resolution of 8 MP in the storage unit 130.

When the analyzed amount of the objects is smaller than the second threshold value, the processing unit 150 performs the resolution adjusting procedure, lowers the resolution of the image from 8 MP (that is, the first resolution) to 4 MP (that is, the second resolution) according to the resolution adjusting data corresponding to the second threshold value (that is, the second adjusting result), and stores the image with the resolution of 4 MP in the storage unit 130. Alternatively, the current resolution setting of the image capturing device 100 is adjusted from 8 MP to 4 MP according to the resolution adjusting data corresponding to the second threshold value (that is, the second adjusting result), and then re-captures an image with a resolution of 4 MP. And, the image capturing device 100 stores the re-captured image with the resolution of 4 MP in the storage unit 130.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A resolution adjusting method, applicable to an image capturing device, wherein the image capturing device comprises a camera module and a storage unit, the resolution adjusting method comprising:
   capturing an image with a first resolution by the camera module;
   analyzing an amount of objects in the image, comprising:
      performing a recognition procedure to recognize and calculate an amount of subjects in the image; and
      determining the amount of the objects according to the calculated amount of the subjects;
   comparing the amount of the objects with at least one threshold value;
   when the amount of the objects is smaller than at least one of the at least one threshold value, lowering the resolution of the image from the first resolution to a second resolution according to the at least one threshold value, and storing the image with the second resolution in the storage unit; and
   when the amount of the objects is greater than or equal to the threshold value, storing the image with the first resolution in the storage unit.

2. The resolution adjusting method according to claim 1, wherein the step of analyzing the amount of the objects in the image further comprises:
   performing an edging procedure to edge the image;
   calculating an amount of graph blocks in the edged image; and
   determining the amount of the objects according to the calculated amount of the graph blocks.

3. The resolution adjusting method according to claim 1, wherein the step of analyzing the amount of the objects in the image further comprises:
   performing an edging procedure to edge the image;
   calculating content of edging elements in the edged image; and
   determining the amount of the objects according to the calculated content of the edging elements.

4. The resolution adjusting method according to claim 1, wherein the first resolution is different from the second resolution for a specific factor.

5. The resolution adjusting method according to claim 1, wherein the first resolution and the second resolution are two resolutions in a setting option of a resolution of the image capturing device, and the first resolution is different from the second resolution for a specific level.

* * * * *